July 8, 1958
C. A. DELLA-PORTA
2,842,387
LOCKING OR CLAMPING DEVICES FOR RELATIVELY
SLIDABLE OR ROTATABLE ELEMENTS
Filed Nov. 27, 1956
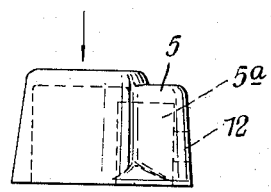
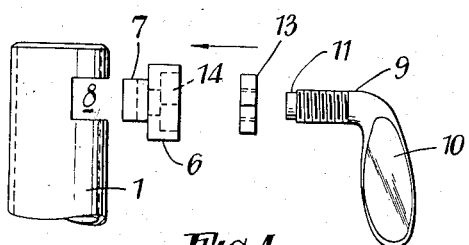
FIG. 1.
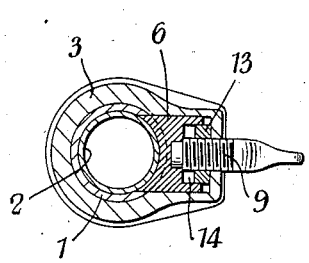
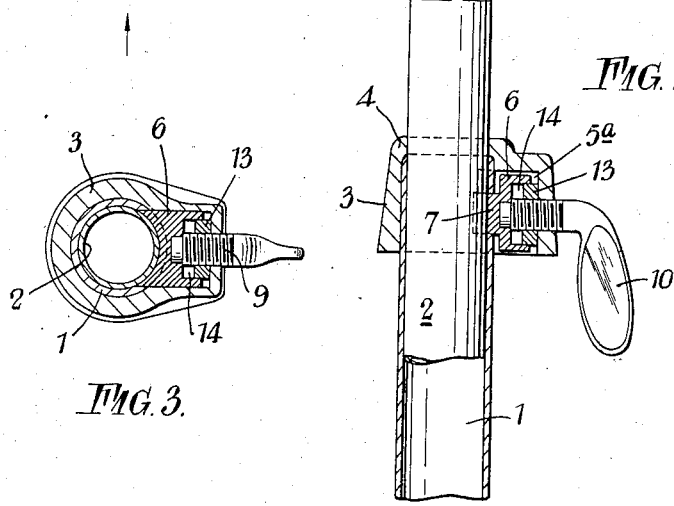
FIG. 2.
FIG. 3.
Clifford Anthony Della-Porta
INVENTOR
By Richardson, David and Hoxton
his ATTORNEYS.

United States Patent Office 2,842,387
Patented July 8, 1958

2,842,387

LOCKING OR CLAMPING DEVICES FOR RELATIVELY SLIDABLE OR ROTATABLE ELEMENTS

Clifford Anthony Della-Porta, South Wigston, England, assignor to The Premier Drum Company Limited, South Wigston, England, a British company Application November 27, 1956, Serial No. 624,619

Claims priority, application Great Britain January 2, 1956

3 Claims. (Cl. 287—58)

This invention relates to a locking or clamping device by means of which a tube or rod and a sleeve, collar or other suitable guide slidable or rotatable one relatively to the other can be secured firmly in position by a clamping action and in which the clamping is effected by the rotation of a screw carried by one of the two parts to be clamped together so as to effect displacement to a friction clamping element relatively to the screw to press the clamping element hard against the other part. The object of the present invention is to relieve the clamping element of the wear due to the drive imparted by the thread of the screw.

According to the present invention the screw rotates idly in a support secured to an outer one of a pair of members to be locked together and in which latter member the other member slides or rotates, the screw being threaded through a nut held against rotation within a clamping element which is displaceable axially relatively to the screw and the nut by reason of the pressure applied to the clamping element by the feed imparted by the rotation of the screw.

By this means the wear due to the driving action of the threads of the screw is taken by the nut which can be of steel or other suitable hard wearing material, whilst the clamping element can be of a softer material, e. g. aluminium, brass etc., and thereby avoid the clamping element biting into or wearing away the surface of the member it is clamped against. Such an arrangement is of advantage with devices such as clamps of drum sticks and similar percussion instruments and the like and for mechanisms and telescopically connected rods, tubes and the like where it is necessary to minimise wear and injury to the clamped article.

Further, according to the present invention a device for clamping or locking together two relatively slidable or rotatable members disposed one within the other comprises a housing fixedly secured to the exterior of the outer member, a clamping element guided slidably in said housing and having a part projecting through an opening in the outer member and adapted to be pressed beyond such opening against the inner member, a nut loose in said clamping element and held against rotation relatively to said clamping element, a screw threaded through said nut and abutting at one end against the clamping element and at its other end passing loosely through said housing and formed with externally accessible means for rotating it.

An embodiment of the invention is illustrated by the accompanying drawings, wherein, Figure 1 is an exploded view showing the parts of the clamping device disassembled.

Figure 2 is a sectional elevation view of the assembled parts, and

Figure 3 is a cross section of Figure 2 taken through the clamp.

Referring to the drawings the two parts to be clamped together are a sleeve 1 and a tube 2 slidable or rotatable in the sleeve. Fixedly secured over one end of the sleeve is a cap or collar 3 with its top shaped as a narrow annulus 4 abutting against the top of the sleeve 1 so that its opening coincides with the bore of the sleeve. This cap has a radial or lateral lug 5 formed with a rectangular compartment 5a open at its base and in opposition to the sleeve 1, and in this compartment is located loosely a clamping element 6 having a width nearly equal to that of the said compartment and being of rectangular form so that it is loose in but does not rotate relatively to the said compartment. This clamping element is formed in one face, midway between its top and base with a web 7 engaged loosely in a substantially correspondingly dimensioned slot 8 in the periphery of the sleeve 1, the free edge of this web being radiused to correspond with the outer radius of the tube 2, the arrangement being such that this radiused edge is urged against the tube 2 to clamp it inside the sleeve 1.

The clamping action is applied by a thumb screw 9 having at one end a wing 10 for its actuation, the other end having its thread removed as at 11 to rotate idly in and press axially against the clamping element 6. The screw 9 passes idly through an opening 12 in the hollow lug 5a and is threaded through a square nut 13 fitted as a sliding fit in a rectangular recess 14 in the face of the clamping element 6 remote from the web 7. Thus the screw and nut can be made of steel or other suitable hard wearing material and the clamping element 6 can be made of a softer material as likewise may the cap 4, the axial load applied by the screw against the element 6 being by reason of the screw being threaded through the nut.

I claim:

1. A locking or clamping device comprising two relatively slidable members disposed one within the other, a housing secured fixedly to the outer one of said members, a clamping element guided slidably in said housing and at one end passing through the outer member and opposed to and adapted to be pressed against the inner member for locking the inner and outer members together, a nut loose in the other end of said clamping element and held against rotation relatively to said clamping element and opposed to the interior of said housing, a screw threaded through said nut and abutting at one end against the clamping element and at its other end passing loosely through said housing and formed with externally accessible means for rotating it.

2. A locking or clamping device according to claim 1 wherein said housing is a collar fixed about the outer one of the two relatively slidable members and formed with a lateral hollow part containing between opposed faces of its hollow the clamping element in the form of a body shaped so that it is free to slide but not rotate between said faces and formed with a web like projection substantially co-axial with but directed away from the screw and passing through a slot in said outer member so as to contact the inner member, a recess in said body facing in the opposite direction to said web-like projection and receiving relatively slidably said nut, the screw passing idly through a hole in the outer end of said radial or lateral hollow part of the collar and being threaded through the nut and at its inner end seated in said body whereby rotation of the screw in one direction urges the nut against the opposed part of the housing and the said web against the inner one of said relatively slidable members.

3. A locking or clamping device comprising a support member, a pair of relatively displaceable members adapted to be readily releasably locked together and disposed one about the other and to the outer one of which said support member is secured, a non-rotatable clamping element, a nut carried by and slidable relatively to said clamping element, the clamping element and nut being inside said support member, and said clamping element being opposed at one side to the inner of said relatively displaceable members to be locked together, a screw rotating idly in said support member, and threaded through said nut and at one end engaged with said non-rotatable clamping element, said nut being held against rotation and the clamping element being displaceable axially relatively to the nut, the said support serving as an abutment for said nut when the screw is rotated in one direction to press the clamping element against the inner one of said pair of relatively displaceable members.

References Cited in the file of this patent

UNITED STATES PATENTS

| | | |
|---|---|---|
| 564,741 | Dunn | July 28, 1896 |
| 1,394,596 | Wohl et al. | Oct. 25, 1921 |
| 2,683,615 | Holt | July 13, 1954 |